US006651082B1

(12) United States Patent
Kawase et al.

(10) Patent No.: US 6,651,082 B1
(45) Date of Patent: Nov. 18, 2003

(54) METHOD FOR DYNAMICALLY CHANGING LOAD BALANCE AND COMPUTER

(75) Inventors: Kei Kawase, Sagamihara (JP); Takao Moriyama, Yokohama (JP); Fusashi Nakamura, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/345,371

(22) Filed: Jul. 1, 1999

(30) Foreign Application Priority Data

Aug. 3, 1998 (JP) .......................................... 10-218852

(51) Int. Cl.⁷ ............................................. G06F 15/16
(52) U.S. Cl. ....................................................... 709/105
(58) Field of Search ......................................... 709/105

(56) References Cited

U.S. PATENT DOCUMENTS 5,031,089 A  *  7/1991  Liu et al. ..................... 364/200
5,692,193 A  * 11/1997  Jagannathan et al. ........ 395/676
6,078,944 A  *  6/2000  Enko et al. ................... 709/105
6,128,642 A  * 10/2000  Doraswamy et al. ........ 709/201

FOREIGN PATENT DOCUMENTS

JP          271867       4/1988
JP          275581       4/1989

* cited by examiner

Primary Examiner—Emanuel Todd Voeltz
(74) Attorney, Agent, or Firm—Douglas W. Cameron; Anne Vachon Dougherty

(57) ABSTRACT

A system and method which dynamically changes the load balance of assigned loads for each group in a sequence of processes from a first stage to an n-th stage in a computer having a plurality of processors, wherein the plurality of processors are grouped into at least two groups, comprises the steps of: detecting a change in a characteristic value in a queue for transferring a processing result between the groups; and changing the assignment of assigned processes for each group based on the change in the characteristic value. A characteristic value stored in a queue represents a value related to work load, and a queue seldom becomes full or empty if the load balance is changed referring to this characteristic value.

12 Claims, 6 Drawing Sheets

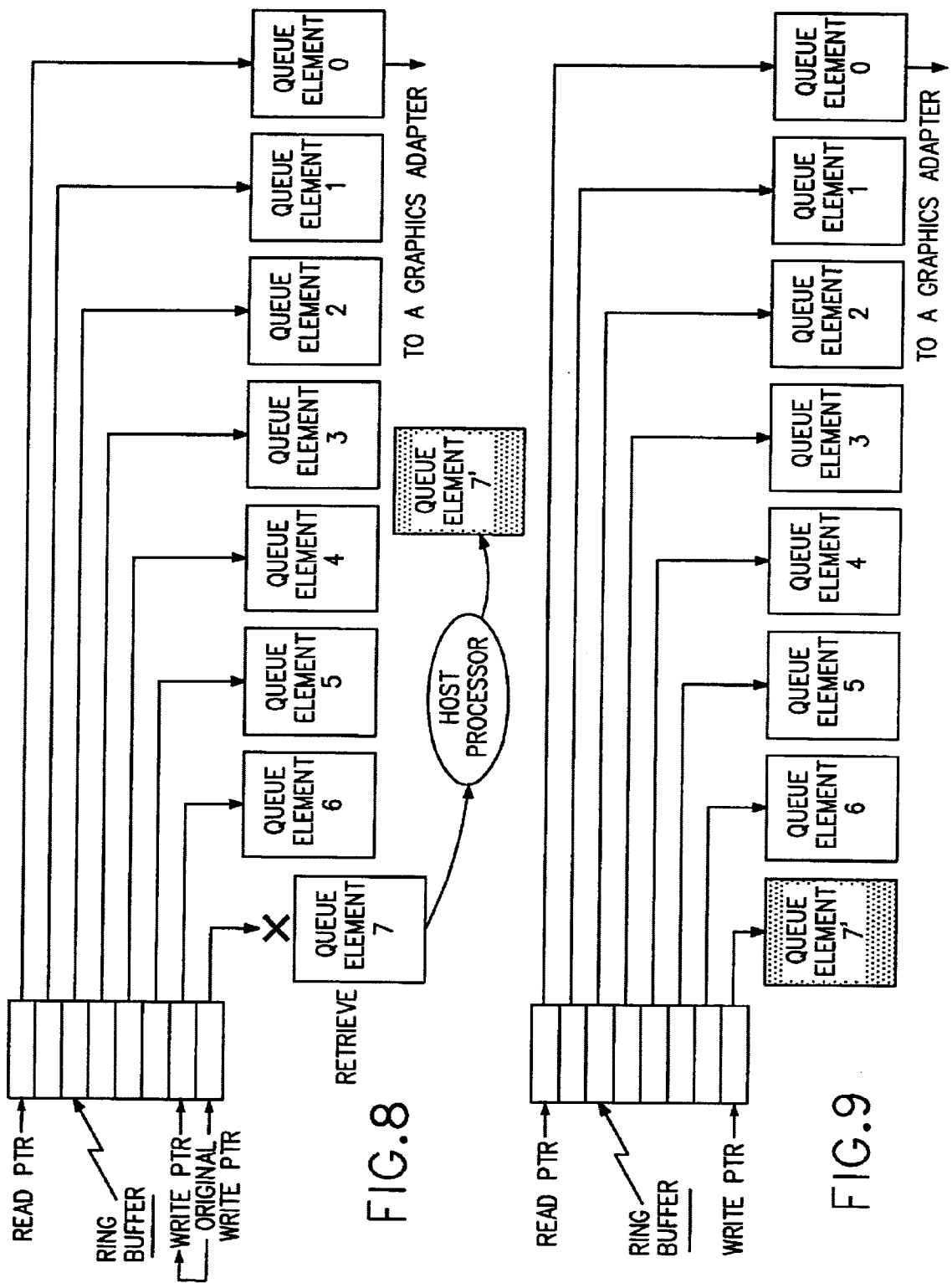

METHOD FOR DYNAMICALLY CHANGING LOAD BALANCE AND COMPUTER

FIELD OF THE INVENTION

This invention relates to dynamic change of the load-balance in a multiprocessor system, particularly to dynamic change of the load balance between a host processor and a graphics adapter in a computer.

BACKGROUND OF THE INVENTION

As regards polygon-based three-dimensional graphics, such as OpenGL and Direct3D, main factors which determine entire performance are as follows:

(1) API-the speed at which a graphics command is issued via API from an application;
(2) Geometry processing-the speed of geometry processing such as triangulation/coordinate transformations/lighting calculation;
(3) Setup processing-the speed of gradient calculation of color value/Z coordinate value/texture coordinate value along with face/edge of the triangle; and
(4) raster processing-the speed of generating pixels which are obtained by interpolation of color values, Z coordinate value, and texture coordinate value, and reading/writing them into a frame buffer.

The first listed factor, the API, does not present a problem since, even if a method is used whereby the API is called for each vertex (which is the worst case), it only takes a few tens of clocks per vertex.

Raster processing corresponds to how many. pixels can be drawn per second (pixel-rate). This pixel rate has nothing to do with a polygon rate (mentioned later), and a required amount is determined by screen size (how many pixels, for instance, 640×480 or 1024×768, a screen is composed of), frame rate (how many frames are displayed per second, which is different from a CRT refresh rate and is generally around 12–60 frames/second), and average overlapping on the screen (normally three times or so). For recently developed graphics adapters, raster processing presents almost no difficulty up to a screen size such as that of SXGA (1280× 1024 pixels).

Performance of geometry and setup processing, (2) and (3), directly corresponds to the number of polygons which can be processed per second (the aforementioned polygon rate). As setup processing is often considered a part of geometry processing, it is regarded as geometry processing here. Geometry processing requires lots of floating-point arithmetic. It takes a few hundred to a few thousand clocks for processing per vertex. Therefore, the throughput of a host processor alone is often insufficient. For instance, when processing 10M vertexes per, second, where 1,000 clocks are required to process each vertex, a processor which works at 10G clocks/second will be necessary. Thus, there are many cases where a functional unit dedicated to geometry processing is set on a graphics adapter. Also, the work load greatly varies depending on conditions of processing, such as number and types of light sources.

Meanwhile, a host processor stores a sequence of graphics commands in main storage device. This sequence of graphics commands is called a command queue. A graphics adapter obtains contents of a command queue by using DMA, followed by processing them and displaying them on a display device. This command queue must physically exist in main storage device or on a graphics adapter for the necessity of performing DMA transfer. Thus, the size of a command queue is limited. If this command queue becomes full or empty in the course of processing, the host processor or the graphics adapter stops so that the entire performance deteriorates. If the command queue is full, the host processor cannot write to the command queue any more, therefore it cannot go on to processing until there is a space in it. Also, if the command queue is empty, the graphics adapter cannot perform processing.

While a command queue does not become full or empty if the processing speed of the host processor and that of the graphics adapter are equal, it has not been possible to make both processing speeds equal for the following reasons:

(a) it is difficult to estimate throughput of a host processor available for graphics processing, since the type/operating frequency/number of host processors are various, and the load of a host processor which is available for uses other than graphics processing is difficult to estimate and changes dynamically;
(b) as in the case of the above-mentioned geometry processing, the work load of a graphics command on a host processor is difficult to estimate since it changes dynamically depending on a current state or data (for instance, the number of vertexes increase or decrease by clipping); and
(c) the work load of a graphics command on a graphics adapter is difficult to estimate since it changes dynamically depending on the current state or data.

Assuming that the throughput and work load of a host processor are $P_h$, $L_h$ respectively and the throughput and work load of a graphics adapter are $P_a$, $L_a$ respectively, processing can go on without a command queue becoming empty or full if $L_h/P_h = L_a/P_a$ holds. However, $L_h$, $P_h$, $L_a$ and $P_a$ are all inestimable and the system's performance could not always be fully exploited.

Japanese Published Unexamined Patent Application No. Hei 2-275581 discloses a technology for improving processing speed of the entire system, if the necessary time for using each function is known in advance, by changing the load on a plurality of processors every time a user switches on/off several functions which he or she uses. However, partial load shifting cannot be appropriately changed when the necessary time for performing a function depends on the data to be processed. Moreover, a host processor is often in a multitasking OS environment and the computational ability assigned to graphics changes every moment, which is also a point where the prerequisite of this patent (i.e., knowing the necessary time) is not appropriate. In addition, this patent requires a table of partial charges corresponding to all combinations of on/off of functions to be made, though such is not practical since the number of functions to be switched on/off is enormous in an actual environment.

Thus, an object of the present invention is to provide a computer system wherein $L_h/P_h \cong L_a/P_a$ in an environment where $L_h$, $P_h$, $L_a$ and $P_a$ are all unpredictable.

Another object is to enable the entire system's performance to be best exploited by bringing it close to $L_h/P_h = L_a/P_a$.

A further object is to allow adaptation to improved throughput of a future host processor thereby extending product life.

Still another object is, even when a command queue becomes full, to keep a host processor from stopping so that the entire system's performance does not deteriorate.

SUMMARY OF THE INVENTION

The foregoing and other objects are realized by the present invention which dynamically changes a partial charge, or assignment of processes, of each group in a sequence of processes from a first stage to an n-th stage in a computer having a plurality of processors, wherein said plurality of processors are grouped into at least two groups. The invention includes the steps of: detecting a change in a characteristic value in a queue for transferring a processing result between the groups; and changing the partial charge of each group based on the increase or decrease of the characteristic value. A characteristic value of data stored in a queue represents a value related to work load, and the queue seldom becomes full or empty if the load balance is changed by referring to this characteristic value. For instance, the characteristic value can be either the amount of information stored in a queue, the size (length) of a queue, or the number of vertex data stored in a queue in the case of processing related to graphics.

The aforementioned changing step may also comprise steps of determining if the characteristic value has increased by a predetermined threshold value or more and setting the charge of a group which performs processes up to an i-th stage ($1 \leq i < n$), where the i-th stage is a boundary between partial charges of the groups, to processes up to a stage following the i-th stage. A process of a stage following the i-th stage means a process of the (i+1)-th stage or subsequent stage. Also, if the characteristic value has decreased by a predetermined threshold value or more, it is possible to execute a step of setting the charge of a group which performs processes up to an i-th stage ($1 < i \leq n$), where the i-th stage is a boundary between partial charges of the groups, to processes up to a stage preceding the i-th stage. A process of a stage preceding the i-th stage means a process of the (i−1)-th stage or a preceding stage.

Also, if partial charges are dynamically changed in this way, a group which performs processes after a stage may need information telling it from what stage processing should be performed. Accordingly, a processing result may include information of the stage of processing which has been completed, It is also possible to further comprise the steps of: examining whether or not usage of a queue has reached an upper bound; and if usage of the queue has reached an upper bound, a processor belonging to a group which performs processes up to an i-th stage ($1 \leq i < n$), where the i-th stage is a boundary between partial charges (i.e., assigned processes) of the groups, retrieving a processing result of the tail end of the queue and storing a processing result in the queue after performing processes up to a stage following the i-th stage. By doing this, even when a command queue becomes full, a host processor can be kept from stopping so that the entire system's performance does not deteriorate.

The computer which implemented the present invention comprises: a plurality of processors which can be grouped into at least two groups and on which a partial charge in a sequence of processes from a first stage to an n-th stage is set for each group; a queue for transferring a processing result between the groups; and a controller for detecting increase or decrease of a characteristic value in the queue and changing the partial charge of each group based on the increase or decrease of the characteristic value.

While the structure of the present invention was explained as above, the present invention may also be implemented by a program which performs each step. In such a case, the program may be stored on a storage medium such as a CD-ROM or a floppy disk or on a storage device or a device such as a hard disk or a ROM. It is also possible to implement a dedicated circuit or device which performs the processing of the present invention.

BRIEF DESCRIPTION OF THE DRAWINGS

The invention will now be described in greater detail with specific reference to the appended drawings wherein:

FIG. 8 is a diagram showing the processing in FIG. 7 in a schematic form; and

FIG. 9 is a diagram showing the processing result in FIG. 7 in a schematic form.

DESCRIPTION OF THE PREFERRED EMBODIMENT

Figure 1:
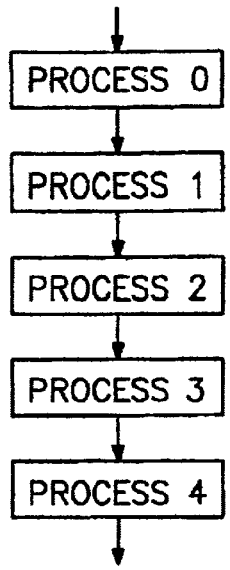
FIG. 1 is an example of a pipelined process.

FIG. 1 shows a group of processes to be handled in pipelined manner. While FIG. 1 shows process 0 to process 4 so as to simplify explanation, there may be cases where either more or fewer processes exist. Processing related to graphics should also be performed in such pipelining.

Figure 2:
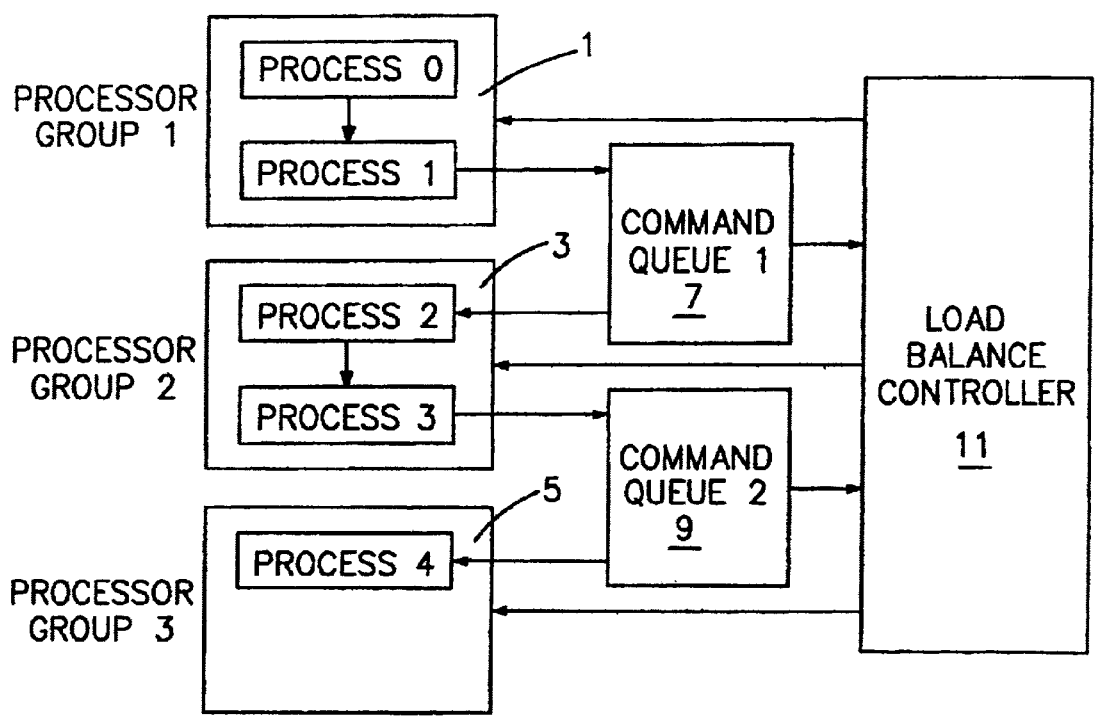
FIG. 2 is a functional block diagram for sharing processes in a plurality of processor groups.

FIG. 2 shows an example of handling processes 0 to 4 in FIG. 1 in three processor groups. Processor group 1 (1) is in charge of processes 0 and 1, processor group 2 (3) is in charge of processes 2 and 3, and processor group 3 (5) is in charge of process 4. They are referred to as processor groups, since the number of processors included in each processor group can be either one or more. Command queue 1 (7) and command queue 2 (9) are used for exchanging data among these processor groups.

While command queue 1 (7) is used for exchanging data between processor groups 1 and 2, command queue 2 (9) is used for exchanging data between processor groups 2 and 3. These command queues may be provided either on a part of the memory used by the processor groups or separately. A command queue requires a size which will not become full or empty for a certain time even if processing speeds of the processor groups on both sides of the command queue change to some extent. This is because throughput changes due to other processes or threads of processor groups and work load of the processor groups on both sides can only be, discretely split and thus $L_1/P_1 = L_2/P_2$ (1 and 2 indicate processor groups 1 and 2) cannot be accurately kept.

Moreover, load balance controller 11 monitors command queues 1 and 2 to detect a change (i.e., an increase or a decrease) in a characteristic value, an index for changing a partial charge of each processor group. Load balance controlled 11 orders processor groups to change load balance as required. While there is one load balance controller 11 provided in FIG. 2, it is also possible to perform the same function in each processor group.

Processor group 1 (1) executes processes 0 and 1, sequentially writes processing results of process 1 to command queue 1 (7), and passes the data to processor group 2 (3) which executes process 2 via a mechanism such as DMA (not illustrated), for instance. Processor group 2 (3) executes process 2 and process 3 by sequentially using processing results in command queue 1 (7), writes processing results of process 3 to command queue 2 (7), and likewise passes the data to processor group 3 (5) which executes process 4. Processor group 3 executes process 4 by sequentially using processing results in command queue 2 (9).

Figure 3:
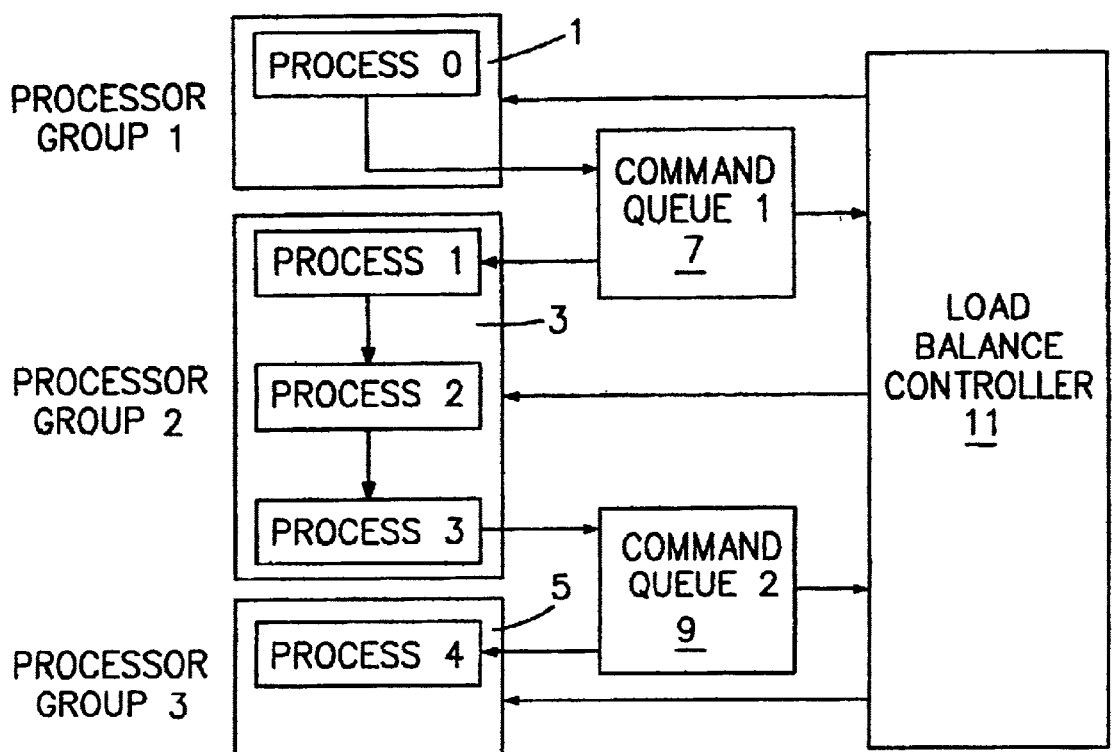
FIG. 3 is a diagram in the event that load balance is changed from those in FIG. 2.

FIG. 3 shows a case where a characteristic value in command queue 1 (7) has decreased by a predetermined threshold value or more. If a characteristic value in command queue 1 (7) has decreased by a predetermined threshold value or more, it means either that the load on processor group 1 (1) has increased or its throughput has decreased, or that the load on processor group 2 (3) has decreased or its throughput has increased. If left as it is, command queue 1 (7) will become empty and processor group 2 (3) will be unused. So, load balance controller 11 orders processor group 1 to execute only process 0 and orders processor group 2 (3) to execute process 1. FIG. 3 shows the state after performing such a change of load balance. If, after this, the characteristic value in command queue 2 (9) decreases by a predetermined threshold value or more, the processes in charge are rearranged between processor group 2 (3) and processor group 3 (5).

Figure 4:
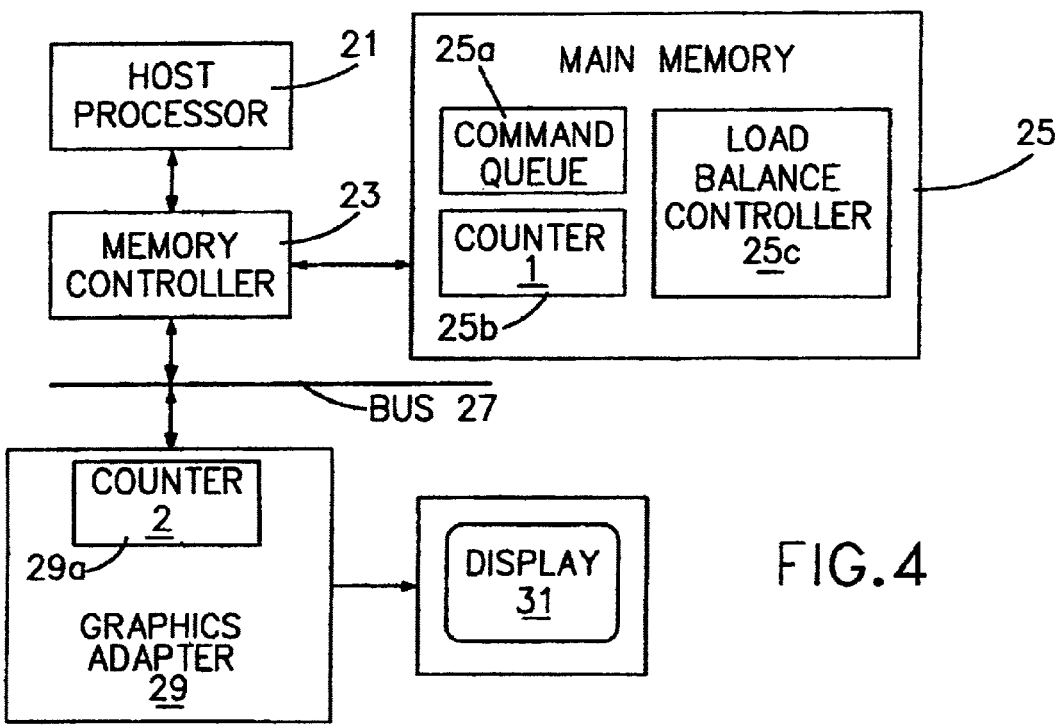
FIG. 4 is a functional block diagram for sharing handling processes of graphics processing between a host processor and a graphics adapter.

In the case of graphics processing on an ordinary computer, there should be two processor groups in FIG. 2 and FIG. 3, to be grouped into a host processor group (comprising one or a plurality of host processors) and a graphics adapter group. FIG. 4 shows an example of a computer of the present invention. Host processor 21 is connected to memory, controller 23. Memory controller 23 is connected to main memory 25 and bus 27. Graphics adapter 29 is connected to bus 27 and this graphics adapter 29 is connected to display 31. As mentioned above, host processor 21 may be a plurality of processors. Memory controller 23 includes a DMA controller. In addition, main memory 25 includes command queue 25a, load balance controller 25c which is implemented as software, and counter 1 (25b) which counts the number of vertex data (which will be input to command queue 25a) processed by host processor 21 in the present invention. Moreover, main memory 25 also includes other software in operation (including programs of allocated processes), which are loaded as required from a hard disk, etc., not illustrated. Graphics adapter 29 includes an unillustrated geometry processor and a raster processor, and counter 2 (29a). which counts the number of vertex data processed, by graphics adapter 29, and a program required for handling processes which may be allocated (not illustrated).

Host processor 21 handles processes which are allocated by using an unillustrated program, and writes the results to command queue 25a via memory controller 23. Each time one vertex data is processed, counter 1 (25b) is incremented by 1. Also, memory controller 23 transmits data from command queue 25a to graphics adapter 29 via bus 27 per predetermined size. Graphics adapter 29 performs allocated processes by using the received data (processing results of host processor 21), and displays graphics on display 31. Counter 2 (29a) is incremented by 1 each time one of the vertex data is processed in graphics adapter 29.

Load balance controller 25c provided on the host processor 21 side periodically acquires values of counter 1 (25b) and counter 2 (29a), and changes the assignments/partial charges of host processor 21 and graphics adapter 29 as explained later by using an increment of each counter value. While, in the present invention, load balance controller 25c is provided on the host processor 21 side, it may also be provided on the graphics adapter 29 side.

Figure 5:
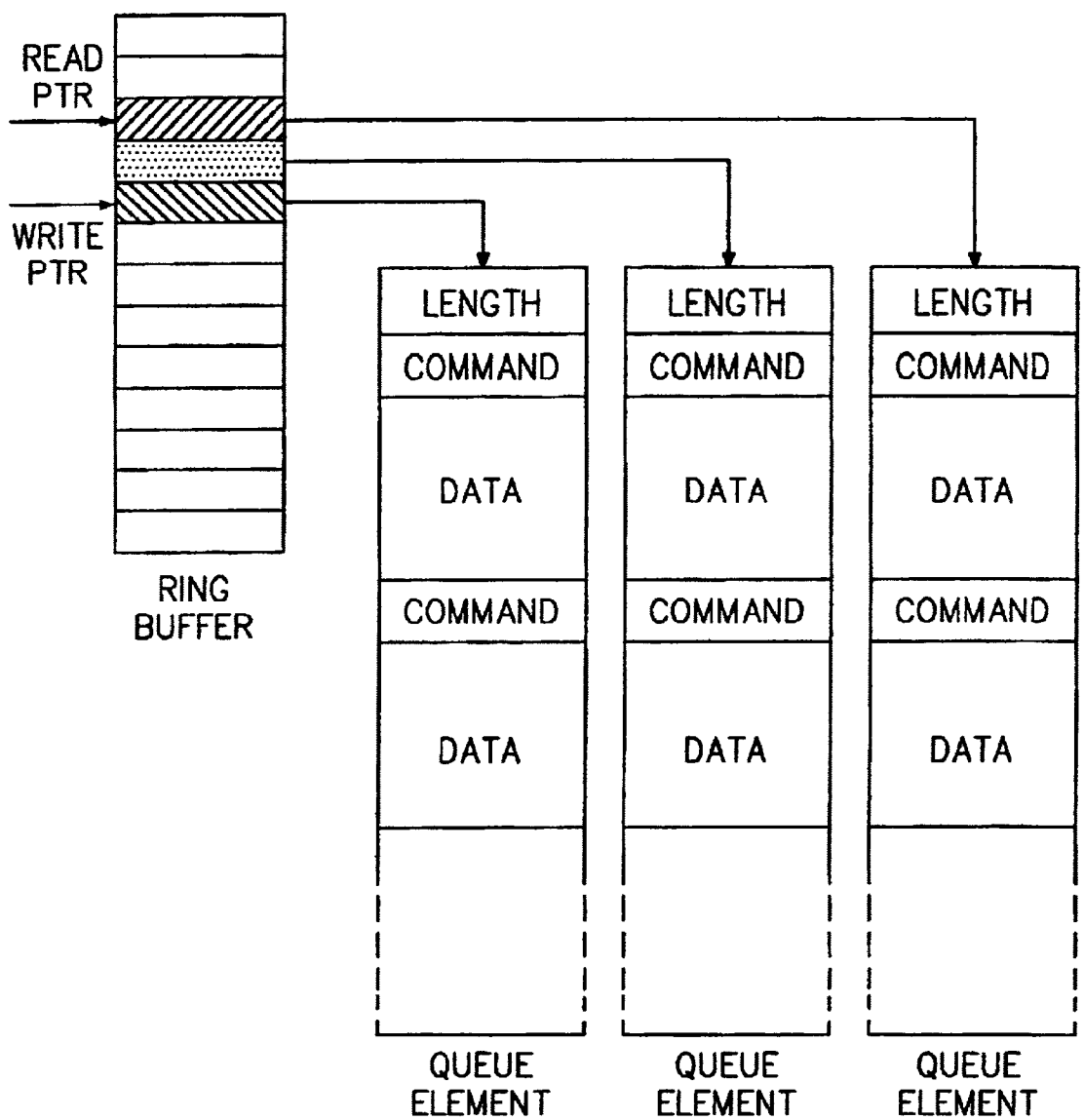
FIG. 5 is an example of a command queue structure.

FIG. 5 shows an example of command queue 25a. For command queue 25a, a linked list structure of a page size or less along a page boundary is desirable due to the issue of page mapping on DMA or the issue of locking when host processor 21 includes a plurality of processors. A ring buffer stores pointers, and each queue element is placed ahead of each pointer. A queue element includes a graphics command (Command) and data (Data), and is less than a page size, such as 2 to 4 KB. Write pointer (Write PTR) points to the last queue element in a queue which the host processor has written to. Read pointer (Read PTR) points to an address of a queue element which graphics adapter 29 should read next. Reading a queue element by DMA advances Read PTR by one.

A method for transferring data between processes is defined in advance between host processor 21 and graphics adapter 29, and a tag representing up to which process has been performed is attached when host processor 21 transmits a graphics command and data as a processing result to command queue 25a. The tag may include, for instance, that up to process 2 has been performed or that processes should be performed starting at process 3. This tag may be included, for instance, in a graphics command in a queue element. By doing so, it becomes clear from which process graphics adapter 29 should perform, (that is, what are the remaining processes so that a correct result will be obtained as a whole).

Before explaining the processing of load balance controller 25c, a characteristic value which load balance controller 25c refers to for changing partial charges of host processor and graphics adapter is explained. As shown in FIG. 4, the number of vertex data stored in command queue 25a is a characteristic value in this embodiment. That is, command queue 25a also includes an instruction to draw a two-dimensional image such as a bit map besides vertex data. In this case, geometry processing is passed by as unnecessary and it is processed at the raster processing section. If a bit map, etc. are in command queue 25a, the command queue size increases; but, in fact, the processing load decreases compared with vertex data. Thus a load shift or partial charge to graphics adapter 29 would not be appropriate, even though such would be indicated if the queue size or length is the characteristic value. Accordingly, in this embodiment, the number of vertex data contained in command queue 25a is treated as the characteristic value. In other circumstances, however, there may be a case where the command queue's length or size could be a characteristic value.

In order to acquire the number of vertex data which is a characteristic value, it is also possible to scan command queue 25a and count. In this embodiment, however, the numbers of vertex data respectively processed by host processor 21 and graphics adapter 29 are counted by counter 1 (25b) and counter 2 (29a) (respectively referred to as count 1 and count 2) so that the number of vertex data existing in command queue 25a is acquired through a difference in increments for a certain period (respectively referred to as Δcount 1 and Δcount 2).

If, for instance, Δcount 2 is larger than Δcount 1 by a predetermined threshold value or more, it can be determined that, since graphics adapter 29 processes faster, command queue 25a will become empty unless a process allocated to host processor 21 is allocated to graphics adapter 29. Alternatively, if Δcount 1 is larger than Δcount 2 by a predetermined threshold value or more, it can be determined that, since graphics adapter 29 processes slower, command queue 25c will become full unless a process allocated to graphics adapter 29 is allocated to host processor 21. It is also possible to make such determination by defining functions of Δcount 1 and Δcount 2.

Figure 6:
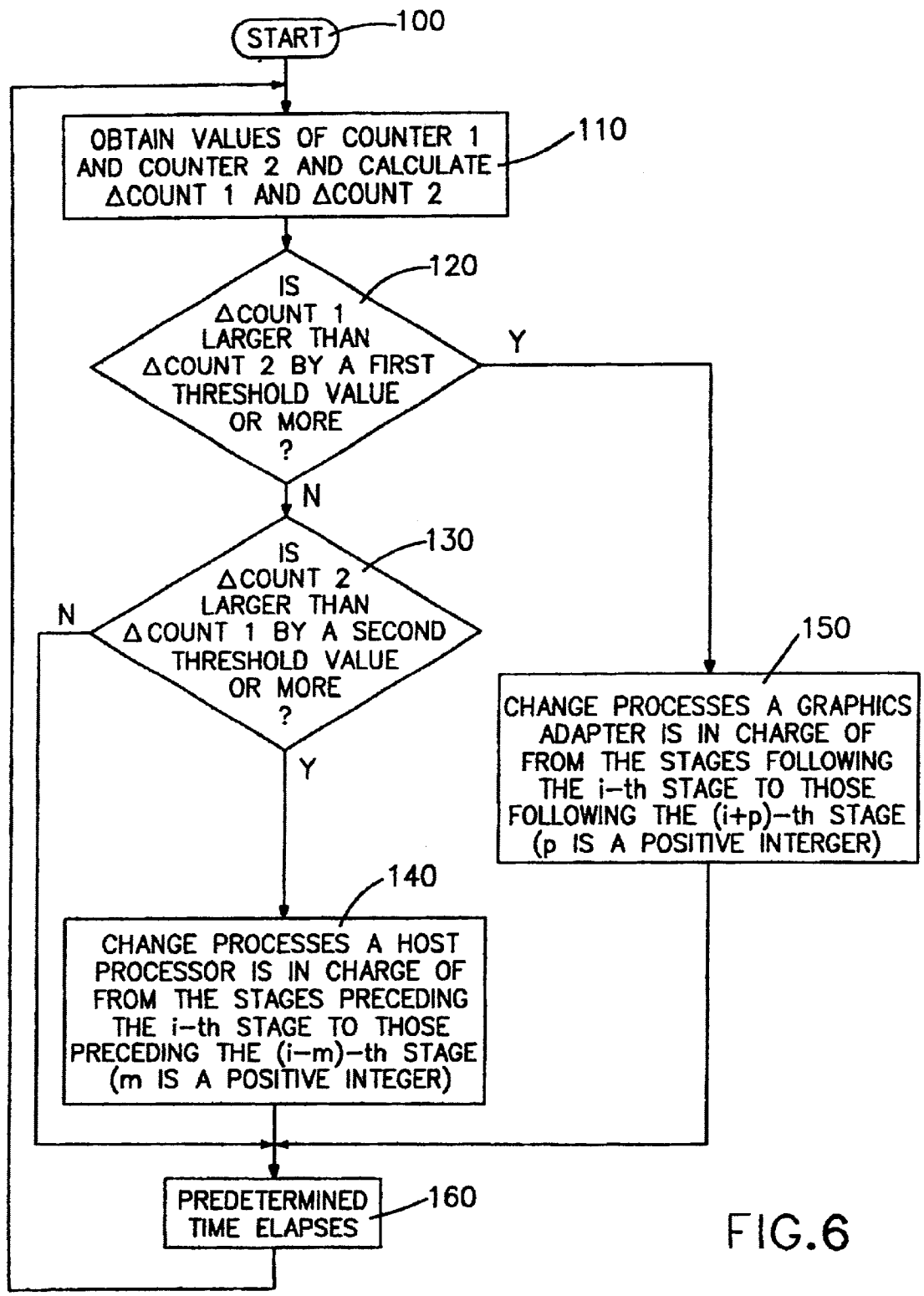
FIG. 6 is a flowchart of a processing of a load balance controller.

FIG. 6 shows a processing flow of load balance controller 25c. First, in order to detect a change in a characteristic value, the values of counter 1 and counter 2 are acquired to calculate Δcount 1 and Δcount 2 (step 110). Then, it is determined whether Δcount 1 is larger than Δcount 2 by a first threshold value or more (step 120). If so, vertex data in command queue 25a has increased beyond an acceptable extent, and thus the queue may become full. Accordingly, the processes of which graphics adapter 29 is in charge are changed from an i-th stage and to an (i+p)-th stage (where p is a positive integer)(step 150). If the processes which graphics adapter 29 is in charge of are decreased, those which host processor 21 is in charge of will automatically be increased.

On the other hand, if the condition of step 120 is not fulfilled, such that it is determined that Δcount 2 is larger than Δcount 1 by a second threshold value or more (step 130), then the vertex data in command queue 25a has decreased beyond an acceptable extent, and the queue may become empty. Accordingly, the processes which host processor 21 is in charge of are changed from an i-th stage to an (i−m)-th stage (where m is a positive integer) (step 140). Then, after a predetermined time has elapsed, the processing from step 110 on is repeated again.

Thus, the assigned load of processes of each processor group is changed based on a change in a characteristic value. The processing flow in FIG. 6 may be changed in various ways. For example, process assignments (a.k.a., partial charges) of the host processor and graphics adapter may be changed by an increase or decrease of Δcount, a difference between Δcount 1 and Δcount 2. Moreover, the first and a second threshold values may be either the same or different. Also, p and m may be either fixed or changeable, depending on the size of the difference between Δcount 1 and Δcount 2.

The predetermined time in step 160 can be determined, by a cycle which keeps command queue 25a from becoming empty. Assuming that the time required for transferring all the current contents of command queue 25a to graphics adapter 29 is X, and the time for creating a queue element at the highest speed on a host side (when having graphics adapter 29 implement maximum processing) is C, then the predetermined time T which is a cycle for changing assignments (partial charges) may be T<X−C.

Figure 7:
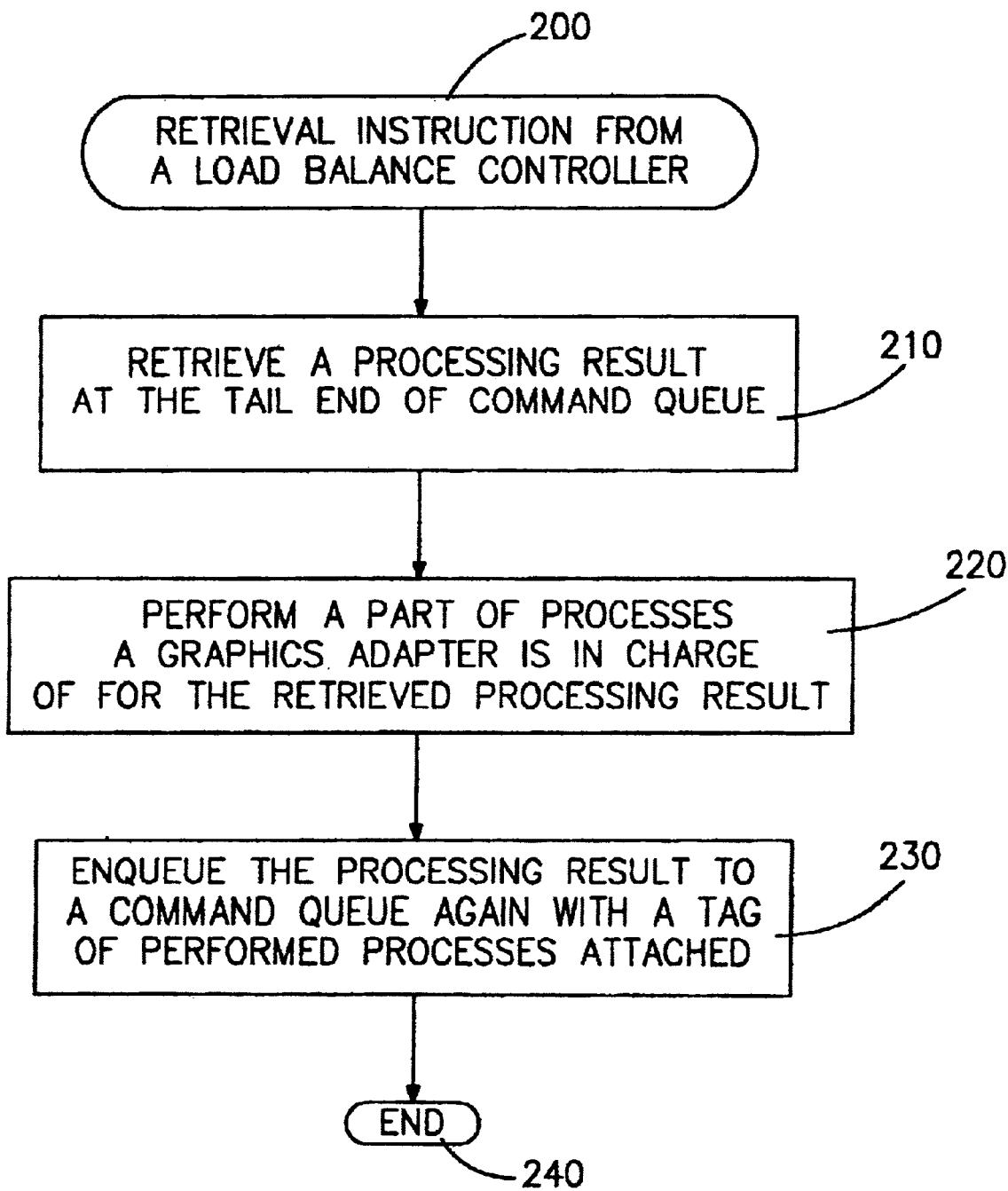
FIG. 7 is a flowchart of a processing of,a host processor in the event that a command queue has become full.

If usage of command queue 25c (its size being normally a few tens of Kbytes to a few Mbytes) reaches an upper bound in spite of there being graphics commands yet to be processed in host processor 21, host processor 21 becomes unable to continue processing. Accordingly, it is checked whether command queue 25a is full or not in timing such as step 120 in FIG. 6. If it is full, load balance controller 25c outputs a retrieval instruction to host computer 21 and then processing as in FIG. 7 is performed. Timing may be different, and host processor 21 may start processing as in FIG. 7 by self-determining at writing.

First, host processor 21 retrieves a processing result of the tail end in command queue 25a (step 210). As in FIG. 8, this is to retrieve queue element 7 at the tail end of the original write pointer (Write PTR) of a ring buffer. The write pointer's location is moved back by one. While one queue element at the tail end is retrieved in this embodiment, a plurality of queue elements may be fetched. Then, a part of the processes which graphics adapter 29 is in charge of is performed to the retrieved processing result (step 230). For instance, if it was in charge of the stages up to the i-th stage, the (i+1)-th stage and thereafter are performed. Since up to what process host processor 21 has performed can be known by seeing a tag attached to a graphics command of a queue element, processes thereafter are performed. The example in FIG. 8 shows, as queue element 7', a result of performing processes of the stages following. Processes may be performed up to any stage. There may be cases, however, where queue element 7' is retrieved again for processing. Lastly, the processing result is enqueued in command queue 25a again with a tag of the performed processes attached (step 230). This tag may be information regarding which processes the graphics adapter 29 should start next. FIG. 9 shows a state after step 230 is complete. In this diagram, command queue 25a is full since queue element 0 has not yet been transferred to graphics adapter 29. However, host processor 21 can start a next process if transfer of queue element 0 is complete. If a command queue should become full, it could be coped with as above.

While an embodiment of the present invention was explained as above, the present invention is not limited to the above embodiment. For instance, structure of a command queue is not limited to the structure as in FIG. 5. A command queue may also be composed by making a chain of queue elements. Moreover, a plurality of processors in a processor group do not have to be of the same throughput. Furthermore, a load balance controller may be either implemented by software or provided with a dedicated circuit, etc.

In an environment where $L_1$, $P_1$, $L_2$ and $P_2$ (respectively work load and throughput of the first processor group and work load and throughput of the second processor group) are all inestimable, a computer system which can bring it close to $L_1/P=L_2/P_2$ could successfully be provided. Moreover, by bringing the relationship of $L_1/P_1$ to $L_2/P_2$ as close to "equal" as possible, the entire system's performance can be fully exploited. Furthermore, the invention can be enabled to adapt to improved throughput of a future host processor, thereby extending product life. In addition, even if a command queue becomes full, the entire system's performance can successfully be kept from deteriorating without stopping processing of a processor group which writes to the command queue.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. A method for dynamically altering the assignment of assigned processes of each group in a sequence of processes from a first stage to an n-th stage in a computer having a plurality of processors, wherein said plurality of processors are grouped into at least two said groups, said method comprising the steps of:

detecting a change in a characteristic value in a queue for transferring a processing result between said groups, said characteristic value representing work load based on the data to be processed; and altering said assignment of assigned processes of each said group based on said change in said characteristic value.

2. The method set forth in claim 1, wherein said characteristic value is the amount of information stored in said queue.

3. The method set forth in claim 1, wherein said characteristic value is the number of vertex data stored in said queue in processing associated with graphics.

4. The method set forth in claim 1, wherein said altering step comprises a step of: if said characteristic value has increased by at least a predetermined threshold value, setting the assignment of a group which performs processes up to an i-th stage ($1 \leq i < n$), said i-th stage being a boundary between assigned processes of said groups, to processes up to a stage following said i-th stage.

5. The method set forth in claim 1, wherein said altering-step comprises a step of: if said characteristic value has decreased by at least a predetermined threshold value, setting the assignment of a group which performs processes up to an i-th stage ($1 < i \leq n$), said i-th stage being a boundary between assigned processes of said groups, to processes up to a stage preceding said i-th stage.

6. The method set forth in claim 1, wherein said processing result includes information regarding what processes of the assigned processes have been completed.

7. The method set forth in claim 1, further comprising the steps of:

inspecting whether usage of said queue has reached an upper bound; and if usage of said queue has reached an upper bound, by a processor belonging to a group which performs processes up to an i-th stage ($1 \leq i < n$), said i-th stage being a boundary between assigned processes of said groups, retrieving a processing result at the tail end of said queue and storing in said queue a processing result after performing processes up to a stage following said i-th stage.

8. A computer comprising:

a plurality of processors which can be grouped into at least two groups and on which an assignment of assigned processes in a sequence of processes from a first stage to an n-th stage is set for each said group;

a queue for transferring a processing result between said groups; and a controller for detecting a change of a characteristic value in said queue, said characteristic value representing work load based on the data to be processed, and for altering the assignment of processes of each said group based on said change of said characteristic value.

9. The computer according to claim 8, wherein, if said characteristic value has increased by at least a predetermined threshold value, said controller is adapted to alter the assignment of processes of a group which performs processes up to an i-th stage ($1 \leq i < n$), said i-th stage being. a boundary between assigned processes for said groups, to processes up to a stage following said i-th stage.

10. The computer according to claim 8, wherein, if said characteristic value has decreased by at least a predetermined threshold value, said controller alters the assignment for a group which performs processes up to an i-th stage ($1 < i \leq n$), said i-th stage being a boundary between assigned processes of said groups, to processes up to a stage preceding said i-th stage.

11. The computer according to claim 8, wherein said controller examines whether usage of said queue has reached an upper bound, and if usage of said queue has reached an upper bound, orders a processor belonging to a group which performs processes up to an i-th stage ($1 \leq i < n$), said i-th stage being a boundary between assigned processes of said groups, to retrieve a processing result from the tail end of said queue and to store in said queue a processing result after performing processes up to a stage following the i-th stage.

12. A storage medium for storing a program for causing a computer to dynamically change the assignment of assigned processes for each group in a sequence of processes from a first stage to an n-th stage, said computer comprising a plurality of processors which can be grouped into at least two groups, said program comprising the steps of:

detecting a change in a characteristic value in a queue for transferring a processing result between said groups, said characteristic value representing work load based on the data to be processed; and altering the assignment of processes for each said group based on said change in said characteristic value.

* * * * *